(12) United States Patent
Blackmon et al.

(10) Patent No.: US 7,613,074 B1
(45) Date of Patent: Nov. 3, 2009

(54) NON-LINEAR OPTOACOUSTIC NARROWBAND COMMUNICATIONS TECHNIQUE

(75) Inventors: Fletcher A. Blackmon, Forestdale, MA (US); Lee E. Estes, Mattapoisett, MA (US); Gilbert Fain, East Freetown, MA (US); Lynn T. Antonelli, Cranston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 684 days.

(21) Appl. No.: 11/326,679

(22) Filed: Jan. 3, 2006

(51) Int. Cl.
*H04B 11/00* (2006.01)
(52) U.S. Cl. ..................................... 367/134
(58) Field of Classification Search ................. 367/134, 367/142
See application file for complete search history.

(56) References Cited

U.S. PATENT DOCUMENTS

| | | | | |
|---|---|---|---|---|
| 3,243,592 | A * | 3/1966 | Kiyo et al. | 398/125 |
| 3,913,060 | A * | 10/1975 | Westervelt et al. | 367/142 |
| 6,130,859 | A * | 10/2000 | Sonnenschein et al. | 367/134 |
| 6,385,131 | B1 * | 5/2002 | Woodsum et al. | 367/142 |
| 7,260,023 | B2 * | 8/2007 | Jones et al. | 367/149 |

OTHER PUBLICATIONS

Yves H. Berthelot, Thermoacoustic Generation of Narrow-Band Signals; with High Repetition Rate Pulsed Lasers, Article, Mar. 1989, pp. 1173-1181, vol. 85, No. 3, J. Acoustic Society of America, USA.

Nicholas P. Chotiros, Nonlinear Optoacoustic Underwater Sound Source, paper, 1988, pp. 255-262, with 2 pgs. of drawings, Applied Research Laboratories, University of Texas at Austin, Austin, TX, USA.

Joachim Noack and Alfred Vogel, Laser-Induced Plasma Formation in Water at Nanosecond to Femtosecond Time Scales: Calculation of Thresholds, Absorption Coefficients, and Energy Density, Article, Aug. 1999, pp. 1156-1167, vol. 35, No. 8, IEEE Journal of Quantum Electronics, USA.

A. Vogel, S. Busch and U. Parlitz, Shock Wave Emission and Cavitation Bubble Generation by Picosecond and Nanosecond Optical Breakdown in Water, Article, Jul. 1996, pp. 148-165, 100(1), J. Acoustic Society of America, USA.

(Continued)

*Primary Examiner*—Ian J Lobo
(74) *Attorney, Agent, or Firm*—James M. Stanley; Michael P. Stanley; Jean-Paul A. Nasser

(57) ABSTRACT

The present invention includes a system and method of use for communications from an in-air platform to a submerged platform. The system includes a laser positionable on the in-air platform above a water medium that sends a pulsed information-bearing laser beam containing a modulated communications signal to create and react in a non-linear regime manner with the water medium at an air/water interface. The beam vaporizes and optically breaks down a portion of the water medium, creates a shock wave and generates bubble oscillations at the vaporized portion. An acoustic sensor on the submerged platform detects these shock wave oscillations within the water medium and a demodulator-decoder that identifies these broadband acoustic transients that contain deterministically placed energy and demodulates-decodes the acoustic transients into the transmitted communications signals from the in-air platform.

4 Claims, 19 Drawing Sheets

OTHER PUBLICATIONS

L.M. Lyamshev and L.V. Sedov, Optical Generation of Sound in a Liquid: Thermal Mechanism (review), Article, Jan-Feb 1981, pp. 4-18, 27 (1), Sov. Phys. Acoust.

Fletcher Blackmon, Lee Estes and Gilbert Fain, Linear Optoacoustic Underwater Communication, Article, Jun. 20, 2005, pp. 3833-3845, vol. 44, No. 18 Applied Optics, USA.

Fletcher Blackmon and Lynn Antonelli, Experimental Domonstration of Multiple Pulse Nonlinear Optoacoustic Signal Generation and Control, Article, Jan. 1, 2005, pp. 103-112, vol. 44, No. 1, Applied Optics, USA.

P.E. Nebolsine, Radiation-Induced Sound, Report, Jan. 1977, i-65, PSI TR-82, Physical Sciences Inc., USA.

Fletcher Blackmon, Lynn Antonelli, Lee Estes and Gilbert Fain., Experimental Investigation of Underwater to In-Air Communications. Conference paper, Jun. 18-20, 2002, UDT Europe Conference, La Spezia, Italy.

Fletcher A. Blackmon, Linear and Non-Linear Opto-Acoustic Underwater Communications, Partial Disertation, May 2003, USA.

* cited by examiner

# NON-LINEAR OPTOACOUSTIC NARROWBAND COMMUNICATIONS TECHNIQUE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a method for a non-contact optoacoustic communications downlink from an in-air platform to a submerged platform.

(2) Description of the Prior Art

In the present art, underwater acoustic telemetry involves a situation of all in-water hardware to establish a communications link. Currently, a method of communications does not exist between an in-air platform to a submerged platform at speed and depth.

In the past and without the aid of buoys, submergible platforms would have to surface to receive high data rate communications from an in-air platform and be able to transmit data to an in-air platform or remote site. Alternatively, the submergible and/or in-air platforms would have to leave behind transmit buoys (ceramic-based transducers that must be submerged for efficient coupling of acoustic energy into the water). These communication procedures can be time-consuming and inefficient.

The ability to generate underwater acoustic signals from a remote, aerial location using a high energy pulsed infrared laser has been demonstrated. The laser beam is directed from the air and focused onto the water surface, where the optical energy is converted into a propagating acoustic wave. An early attempt to control the laser-generated acoustic spectrum via a two unit $CO_2$ laser pulse system has been demonstrated.

Laser light incident on an absorbing material such as water produces sound relating to the physical nature of the interaction. In the linear regime, methods of communication have been considered in little detail due to the low conversion efficiency. However, in the non-linear regime, narrowband communication schemes do not exist at all and for that matter little has been done with closely spaced time sequential multiple pulses for any application.

In the late 1970s, the Soviet researcher Lyamshev and in the late 1980s, Berthelot studied the use of pulse train laser intensity modulation for communications in the linear regime where the laser absorbing material is water. It was shown theoretically that an impulse train is the most efficient method of concentrating energy at a tonal location given the constraint of equal energy. However, at that time and to this day, it is more efficient with commercially available lasers with power and energy limitations to use long pulse continuous wave intensity modulated laser beams for optoacoustic sound generation of specific acoustic tonal frequencies.

It is also known in the art that non-linear optoacoustics demonstrate the potential to create useful acoustic signal levels. It has been theoretically shown that a laser pulse repetition rate can be used to control the spectrum of the generated optoacoustic signal in the non-linear optoacoustic regime. Also, the laser wavelength and laser pulse duration used can determine the acoustic transient effects which occur subsequent to the initial optical breakdown induced shock wave transient. The cavitation bubble size determines the acoustic frequency that can be generated since the bubbles can oscillate at these frequencies.

As such, a need exists for a system and method of use, which utilizes a pulse repetition laser and a non-linear regime to enhance optoacoustic communication between an in-air platform (i.e. aircraft) and a submerged platform.

The key advantages are that such a system would employ a non-contact, covert, optical method to provide greatly enhanced communications and remote active transmission capabilities that do not currently exist and that solve mission problem areas, eliminating the need to employ non-disposable tethered sound sources from the air or disposable resources such as sonobuoys.

SUMMARY OF THE INVENTION

Accordingly, it is an object of the present invention to provide a method for communication from an in-air platform to a submerged in-water platform;

To attain the object described, a system and method of use is provided for underwater acoustic transmission from a position in the air to a position below the water surface. In the present invention, a high-powered, pulsed laser system generates in-water acoustic signals by employing optical to acoustic energy conversion techniques at the air/water interface.

The laser generation of sound is produced most efficiently by a non-linear, optoacoustic effect which employs optical to acoustic energy conversion at the water surface through the phase transition of water to vapor and then transition to a plasma state. This conversion creates an optical breakdown induced acoustic shock wave with subsequent bubble oscillation produced shockwaves. The shockwaves are measurable by receivers known to those skilled in the art.

The optoacoustic transmitter is a pulsed infrared laser. The laser provides a standoff method for transmitting an acoustic waveform from an in-air platform into the water via conversion of optical energy into acoustic energy at the air/water interface. This optoacoustic energy transfer system represents a non-linear regime on the basis of energy density and intensity introduced to the medium.

The non-linear regime has the potential to provide acoustic signals whose amplitudes are orders of magnitude larger than that possible in a linear regime of optoacoustic generation. In the non-linear regime, the types of physical phenomena that are produced are based on optical energy density and intensity considerations rather than linear thermal-induced water density variations.

The laser energy at the water surface can be high enough above an intensity and energy density threshold to vaporize the water. In ascending level of energy conversion efficiency, the phenomena are as follows: thermodynamic parameter changes, weak and strong surface evaporation as well as bulk evaporation in the water media, and evaporation followed by optical breakdown (ionization) of the vapor material with subsequent cavitation bubble production. The optical breakdown of the water medium creates large acoustic pressure fluctuations in the water compared to the linear regime generated sound.

In the non-linear optoacoustic regime, a single laser pulse of the laser produces broadband acoustic transients with considerable acoustic energy. Subsequently, the generated cavitation bubbles then oscillate in dimension, collapsing and re-expanding, create additional in-water acoustic signals of various frequencies depending upon the size of the bubbles generated. The temporal structure of the multiple transients that are created is directly related to the laser pulse energy where the pressure amplitude is non-linearly proportional to the laser energy that is coupled to the water.

The required energy densities and intensities required to transition from the linear regime to the non-linear regime are provided for by focusing the laser light from the laser, nominally Nd:Glass or YAG with a wavelength of 1050-1064 nm, with a focusing lens so as to produce a reduced spot size on or slightly below the surface of the water. A single laser pulse producing a non-linear optoacoustic reaction produces a single or multiple temporal transient(s) that may last up to half a millisecond with a spectrum that is extremely wide where the energy is distributed fairly uniformly.

The narrowband communications technique that is proposed for patentability involves using high intensity, high energy density, short duration, variable repetition rate laser pulses in the non-linear optoacoustic regime to produce a narrowband acoustic spectrum consisting of the fundamental laser repetition frequency and its harmonics instead of a wideband signal whose energy is distributed at lower amplitude and more uniformly over the frequency space. The spectral positioning of the tones using this new technique can be controlled easily by varying the laser repetition rate during each symboling interval. The higher the repetition rate, the lower the number of generated tones and therefore the higher the tonal amplitude due to energy conservation arguments. Tones at the laser repetition rate and its harmonics up to a cutoff frequency are created at high amplitudes that are several orders of magnitude larger than those that can be generated using any linear regime modulation technique with existing technology and reasonable complexity.

This new system and method of use allows for an M-ary FSK and/or frequency-hopped spread spectrum communication scheme. These M-ary communications (tonal positioning) schemes are used in acoustic telemetry as well as other communications fields. More specifically, the details of this novel non-linear communications procedure are the following. Each laser pulse creates a high peak amplitude acoustic shock wave having an exponential time profile that is of extremely short duration. This phenomenon in the literature is termed laser induced optical breakdown. It is also possible to create several subsequent cavitation bubble shock waves of the same general character at various delays following the initial laser induced breakdown produced acoustic transient. This collection of acoustic events represents the acoustic response to one laser pulse of the pulse train. It should be noted that a number of pulses at the same repetition rate within a given time period constitutes a symbol in this scheme.

These acoustic events may be concatenated constructively in the time domain using a laser repetition rate that is coherent (multiple of the synchronicity) with the time delays between acoustic transients produced during one laser pulse interval. This coherent combining serves as a way of increasing the acoustic amplitude at a tonal frequency by approximately a factor of four over the case of no cavitation.

As disclosed, optoacoustic technology presents opportunities for use such as transmitting acoustic communication signals from surface vessels and aircraft to submerged vessels, and active optoacoustic sonar that can be used for test, evaluation, training, and tactical missions. The key advantages are that this method employs a non-contact, covert, optical method to provide enhanced communications and remote active transmission capabilities that do not currently exist and that solve mission problem areas, eliminating the need to employ non-disposable tethered sound sources from the air or disposable resources; such as sonobuoys.

A commercially-available high repetition rate laser operating in the non-linear optoacoustic regime, is used in the following description section to demonstrate the system and method of use. The acoustic source level and controlled frequency content of the acoustic transmissions detected by an underwater hydrophone (or other suitable sensor) are also presented to support the feasibility of the remote optoacoustic transmission scheme.

BRIEF DESCRIPTION OF THE DRAWINGS

Further objects and advantages of the invention will become apparent from the following description and claims taken in conjunction with the accompanying drawings in which:

DESCRIPTION OF THE PREFERRED EMBODIMENT(S)

Figure 1:
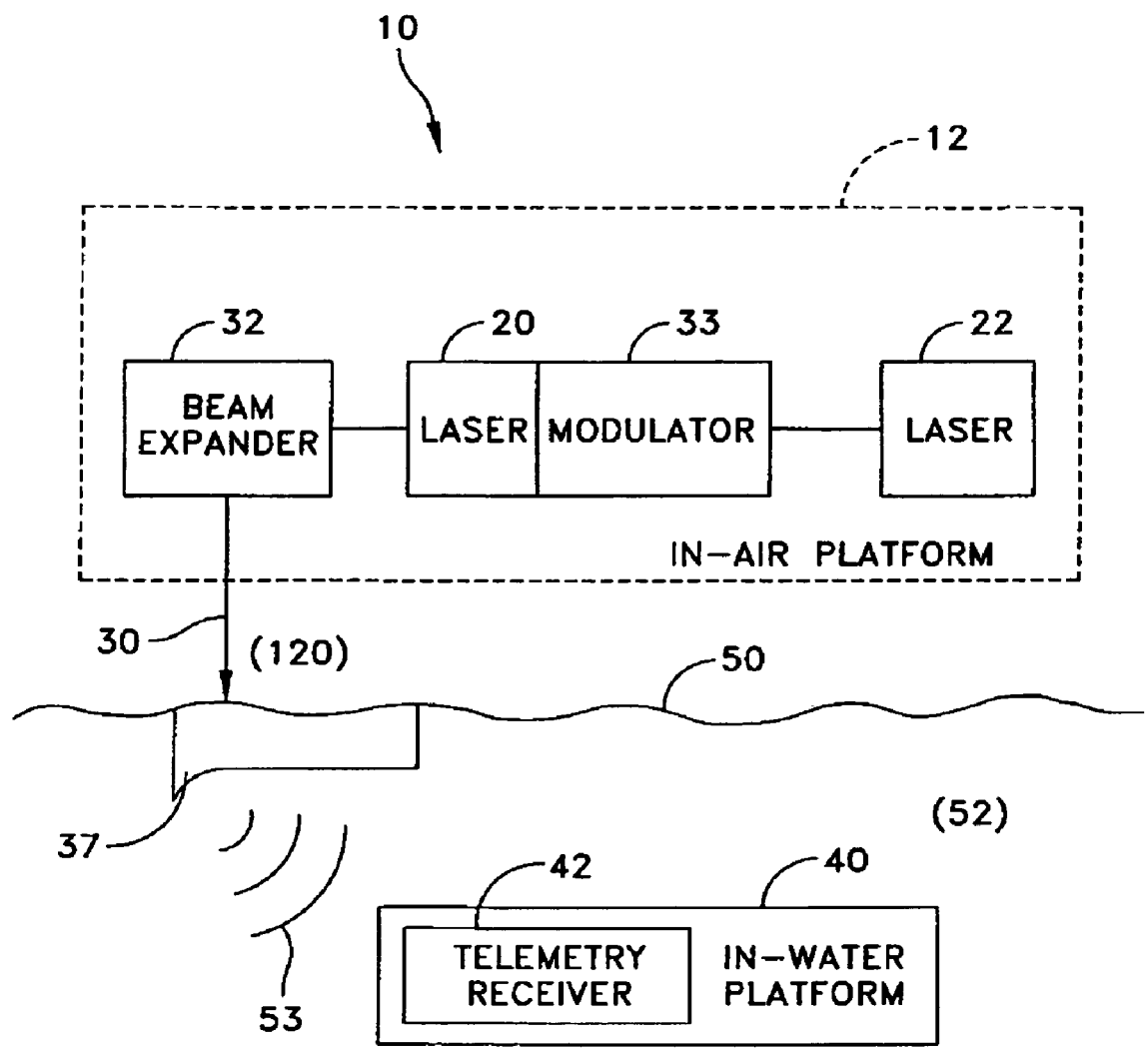
FIG. 1 depicts a block diagram of a laser-based optoacoustic downlink communications technique.

Returning now to the drawings in detail wherein like numerals indicate like elements throughout the several views, the system 10 of an optoacoustic transmission generally comprises a main component of a high-power, pulsed infrared laser 20. As shown in FIG. 1, the laser 20 provides a standoff method for transmitting an acoustic waveform from an in-air platform 12, such as an aircraft, into a water surface 50 via conversion of optical energy into acoustic energy at the air/water interface 120. This optoacoustic energy transfer transforms into a non-linear regime on the basis of energy density and intensity introduced to a water medium 52.

In addition to the laser 20, another laser 22 may be part of the system 10 and onboard the in-air platform 12. The laser 20 is for transmission and the laser 22 would be for reception.

The system 10 of the present invention is preferably used in conjunction with the transmission, reception, sensing and demodulator-decoding capabilities of an in-water platform 40 where the laser 20 converts energy directed at the water medium 52 into acoustic communication signals 53; thereby, obtainable by the in-water platform.

The optoacoustic signal generation by the laser 20 can employ either the linear or non-linear regime of conversion processes depending on the particular application. The linear regime provides acoustic beam pattern control and moderate data rate and in-water range capability. The non-linear regime, described and claimed herein, provides a downward looking dipole beam pattern and greater data rate and in-water range capability.

The optoacoustic communications technique of the present invention includes a modulator 33 as part of the in-air platform 12. The modulator 33 creates a typical communications scheme for underwater propagation such as Frequency Shift Keying (FSK), or frequency-hopped spread spectrum encoded signals.

The non-linear regime of optoacoustic generation provides acoustic signals whose amplitudes are orders of magnitude potentially larger than that possible in a linear regime. In the non-linear regime, the types of physical phenomena that are produced are based on optical energy density and intensity considerations rather than linear thermal-induced water density variations. The laser energy at the water surface 50 is high enough above an intensity and energy density threshold to vaporize the water medium 52.

In ascending level of energy conversion efficiency, the phenomena are as follows: thermodynamic parameter changes, weak and strong surface evaporation as well as bulk evaporation in the water medium 52, and evaporation followed by optical breakdown (ionization) of the vapor material with subsequent cavitation bubble production. The optical breakdown of the water medium 52 creates large acoustic pressure fluctuations in the water compared to linear-regime generated sound.

For the communications downlink, in general, data is transmitted by laser beam 30 of the laser 20, converted to an acoustic signal; and received, demodulated and decoded by a sensor and onboard telemetry receiver 42 of the in-water platform 40.

In the non-linear optoacoustic regime, a single pulse from the laser 20 can produce broadband acoustic transients with considerable acoustic energy. Subsequently, the generated cavitation bubbles then oscillate in dimension, collapsing and re-expanding, creating additional in-water acoustic signals of various frequencies depending upon the size of the bubbles generated. The temporal structure of multiple transients that are created is directly related to the pulse energy of the laser 20 where the pressure amplitude is non-linearly proportional to the laser energy that is coupled to the water medium 52.

The energy of each cavitation bubble is directly proportional to the maximum bubble radius raised to the third power. Each successive cavitation bubble has less energy and peak pressure since a shock wave containing mechanical energy is emitted and heat is exchanged with the surrounding environment. As a result, the remaining mechanical energy is depleted since no new energy is imparted from the laser 20 during this time.

The number of distinct cavitation bubbles generated and the shape of the acoustic transients is related to the total mechanical energy that is made available from the laser energy of the laser 20. Typically, three or four transients are generated before the energy needed for additional transients has dissipated. In addition, the time interval between successive cavitation transients is twice the bubble collapse time which is directly proportional to the maximum bubble radius and also directly proportional to the cube root of the cavitation bubble energy.

The acoustic waveform that is created and the associated spectral character of the acoustic waveform is controlled by proper choice of light modulation parameters such as the repetition rate of the laser 20, laser wavelength, laser pulse duration and then laser beam focusing. It has been demonstrated that the spectrum of the non-linear optoacoustic-generated signal has tones separated in frequency that can be controlled by the repetition rate of the laser 20. The general time domain expression for the pressure waveform as a function of range and vertical observation angle is given in Equation (1) as:

$$p(r, \theta, t) = P_m(r, \theta) \sum_{n=0}^{N-1} \exp\left[-\frac{(t - nT_R)}{\tau(r)}\right] u(t - n_{T_R}) + \sum_j P_{Bj}(r, \theta) \sum_{n=0}^{N-1} \exp\left[-\frac{(t - T_{Bj} - nT_R)}{\tau_{Bj}(r)}\right] xu(tT_{Bj} - nT_R) \quad (1)$$

where
N=number of laser pulses
$T_R$=laser pulse repetition period
$T_{Bj}$=time delay between peak of plasma-generated transient and peak of jth cavitation generated transient
$P_m(r,\theta)$=peak pressure of plasma-generated acoustic transient as a function of range
$P_{Bj}(r,\theta)$=peak pressure of jth cavitation generated acoustic transient as a function of range
$\tau(r)$=time constant of plasma generated acoustic transient as a function of range
$\tau_{Bj}$=time constant of jth cavitation generated acoustic transient as a function of range.

The pressure time waveform as a function of range and observation angle consists of an optical breakdown pressure term followed by a summation of time-delayed, bubble cavitation generated pressure terms. Each pressure term is a scaled exponential acoustic transient.

The magnitude of the corresponding acoustic pressure spectrum is given in Equation (2) by:

$$|P(r, \theta, \omega)| = \left|\frac{\sin\left(\frac{N\omega T_R}{2}\right)}{\sin\left(\frac{\omega T_R}{2}\right)}\right| \cdot \left|\left[\frac{P_m(r,\theta)\tau(r)}{1+j\omega\tau(r)} + \sum_j \frac{P_{Bj}(r,\theta)\tau_{Bj}(r)}{1+j\omega\tau_{Bj}(r)}\exp(-jwTbj)\right]\right|. \quad (2)$$

The pressure spectrum magnitude is then the product of the magnitude of the single-pulse Fourier transform given in the bracketed term in Equation (2) and the magnitude of the periodic Sinc function or Dirichlet function which has maxima at the repetition frequency of the laser 20 and the harmonics of the laser.

It has also been demonstrated that the beam pattern of a similar laser generated acoustic source has its maximum value directed vertically downward normal to the air/water interface 120. Since the optical absorption coefficient is large, the size of the acoustic source is therefore small compared to an acoustic wavelength at the acoustic frequencies of interest. As a result, the laser generated acoustic source behaves similarly to a dipole source whose beam pattern narrows somewhat as the acoustic frequency increases.

It can be assumed in Equation (1) and Equation (2) that a set of acoustic transients is produced for each pulse of the laser 20. In practice, this condition may not hold without some method of dithering or scanning the laser beam 30. The presence of a vapor barrier and the existence of cavitation bubbles, due to preceding laser pulse interactions, can preclude linear superposition of laser-generated acoustic transients. In that event, it is necessary to move the point of laser beam incidence for each laser pulse to avoid this effect.

The capability for producing acoustic communication signals via laser-based optical methods has also been demonstrated. In addition, experiments in the non-linear regime have been conducted demonstrating increases in the acoustic source level, i.e., the SPL from $\geq$178 dB re μPa to 185 dB re μPa in water. Also, limited experimental evidence for the spectral control of the acoustic waveform in the case of two laser pulses separated by a given repetition rate using a $CO_2$, 10.6 micron, laser has been demonstrated generating a sound pressure level in excess of 200 dB re μPa. However, the focusing techniques required for laser generated sound would need to be scaled appropriately to provide longer focal lengths needed for a practical system.

In the improvement of the present invention, a varying to high repetition rate for the laser 20 is employed. Table I summarizes the characteristics of commercially-available laser to use as the laser 20.

TABLE I

Properties of the Pulsed High-Energy Laser 20

| Laser Type | Q-Switched DPSS ND:YLF |
|---|---|
| Optical Wavelength | 1053 nm |
| Laser Energy per Pulse | $\geq$10 mJ |
| Pulse Duration | 70 ns |
| Beam Diameter | 1 mm |
| Pulse Repetition Rate | $\leq$10 kHz |
| Pulse to Pulse Stability | 3% |

Proper optical focusing of the laser 20 provides a beam radius of approximately 3 μm.

Figure 2:
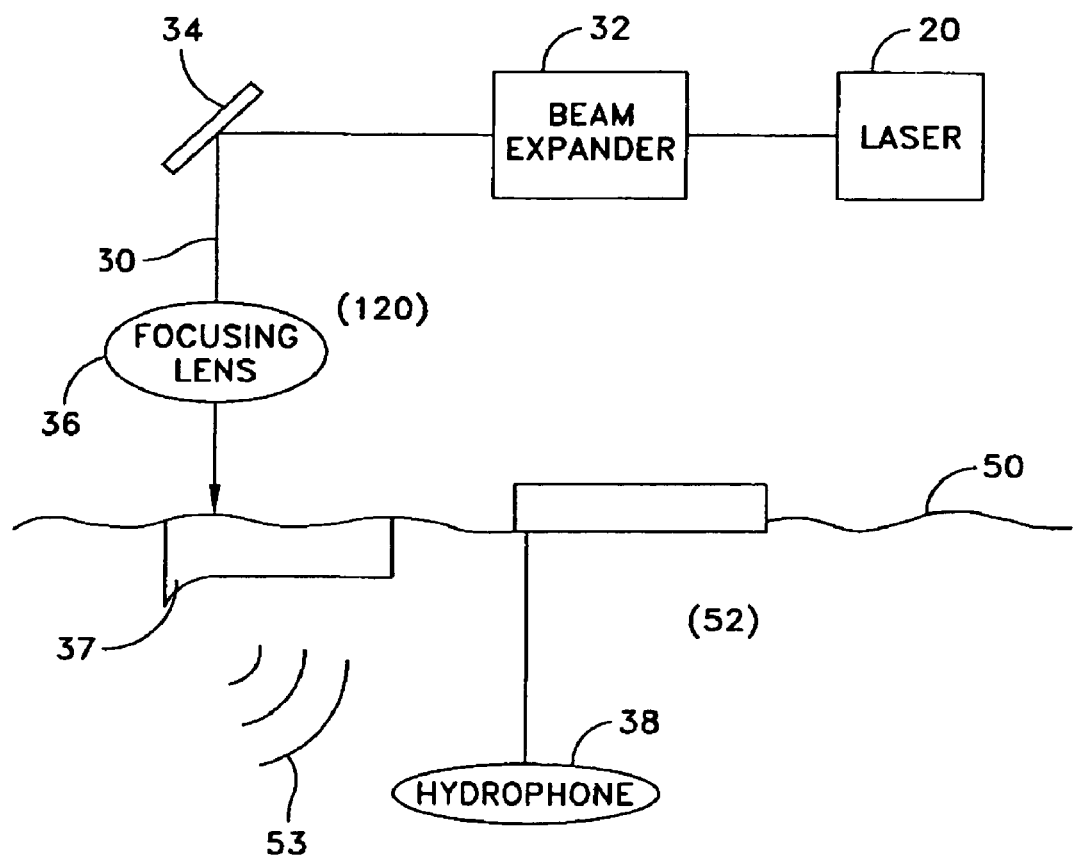
FIG. 2 depicts a setup for testing of the communications technique for optoacoustic transmissions.

A test setup demonstrating the feasibility the system 10 of the present invention is shown in FIG. 2. Using the setup, laser pulses (each lasting 70 nanoseconds) from the laser 20 are directed at a desired repetition rate through an 8× optical laser beam expander 32 (the beam expander is also shown in FIG. 1 for operational depiction) and then at a 45°-angled mirror 34 followed by a focusing lens 36 to produce a laser spot 37 with a size of approximately 6 μm in diameter on the water surface 50. The optimal height from the end of the focusing lens 36 to the water surface 50 is approximately 40 millimeters.

A single monitoring hydrophone 38 is placed one meter below the water surface 50 at an angle of 0° relative to the point of incidence of the laser beam 30 to record the underwater acoustic signal generated by the laser 20. The typical hydrophone 38 records sound pressure level (SPL), temporal, and spectral characteristics of the in-water acoustic signal. In an operational environment, the sensor and telemetry receiver 42 would perform the functions of the hydrophone 38 as well as sensing and demodulator-decoding functions.

The test also demonstrates that the components of underwater sound frequency can be controlled based on Equations (1) and (2). A single, short duration pulse of the laser 20 at the air/water interface 120 surface produces broadband sound. By pulsing the laser 20 at a particular repetition rate, the non-linear optical to acoustic energy conversion produces acoustic signals in the water medium 52. Ideally, the repetition rate of the laser 20 allows control of the spacing between frequency components contained in the acoustic signal spectrum.

Experiments using this configuration at varying repetition rates of 50-1000 hz, yield broadband acoustic transients with peak SPLs of approximately 185 dB re μPa at a distance of 1 meter which corresponds to a signal spectral density in a 312.5 kHz bandwidth of 3.16 Pa/$\sqrt{Hz}$ at 1 meter for all tests with the varying laser repetition rates.

Figure 3:
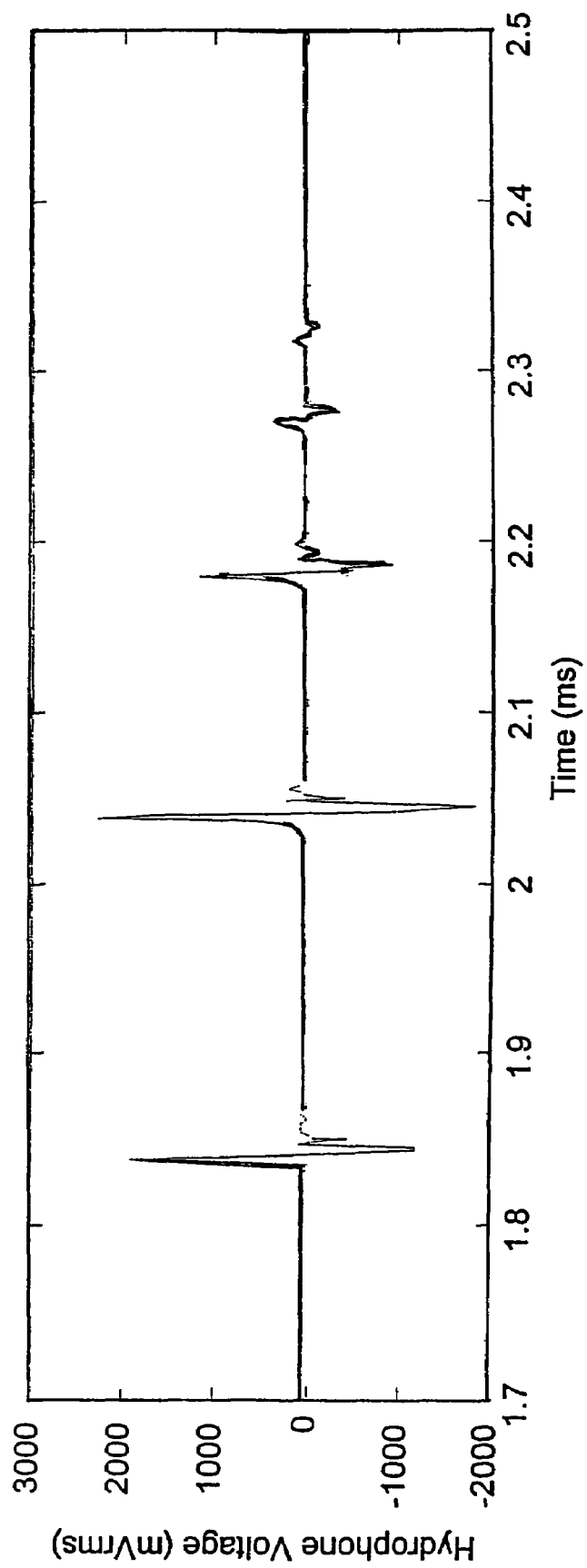
FIG. 3 depicts a plot of an underwater acoustic signal transient generated by a single laser pulse with the figure showing a detailed time structure of the optoacoustic transient.

FIG. 3 depicts the details of the temporal structure of the generated underwater acoustic signal created from a single pulse of the laser 20. Several transients associated with the single optoacoustic transmission pulse are visible. Therefore, each time a non-linear optoacoustic transmission is produced, three to four additional transient oscillations following the optical breakdown transient are created. The extent of this multiple transient response lasts less than 1 millisecond.

The first transient contained in the acoustic transmit pulse is related to the initial optical breakdown of the water molecules due to the high energy density and intensity introduced by the pulse of the laser 20 at the focal point at the air/water interface 120 which, at the same moment, produces an acoustic shock wave. The subsequent acoustic transients are associated with acoustic signal generation from oscillating (expanding and contracting) air bubbles generated during optical breakdown and vaporization of the water medium 52.

The initial cavitation bubble transient appears to be larger than the optical breakdown related acoustic transient is most likely due to rise time considerations of the hydrophone 38 as well as differing nearfield shock wave pressure decay exponents for optical breakdown and cavitation. The cavitation generated acoustic transients have decreasing amplitude due to a decrease in the energy available to sustain subsequent cavitation bubbles. The transients associated with this single non-linear optoacoustic transmission occur in the time record in FIG. 3 at 1.84 milliseconds, 2.04 milliseconds, 2.17 milliseconds, 2.27 milliseconds and 2.32 milliseconds, respectively.

Figure 4:
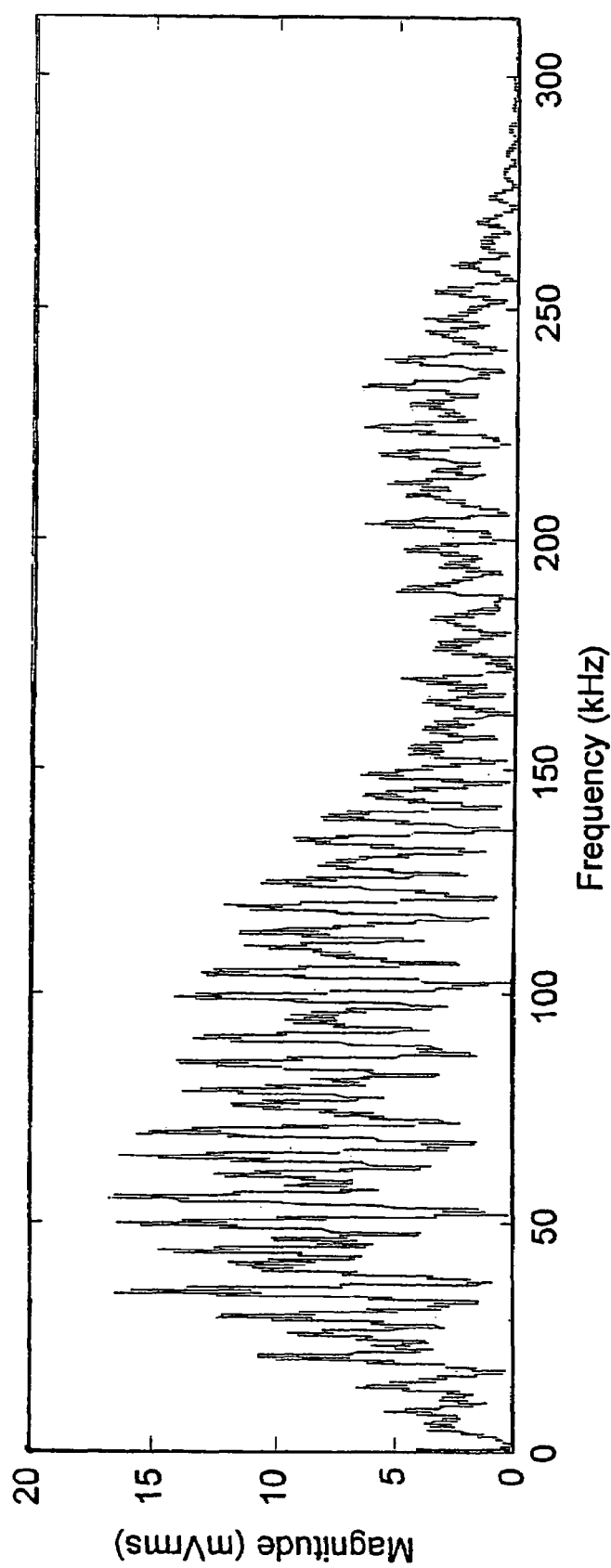
FIG. 4 depicts a plot of an underwater acoustic signal transient generated by a single laser pulse with the figure showing detailed Fourier transform.

The Fourier transform in FIG. 4 depicts a broadband spectral response with peaks separated by 5000 Hz which are associated with the time difference between the first two peaks in FIG. 3. The first two transients have most of their energy concentrated between 20 kHz and 130 kHz. The third transient has a lower amplitude in nearly the same frequency band.

Figure 5:
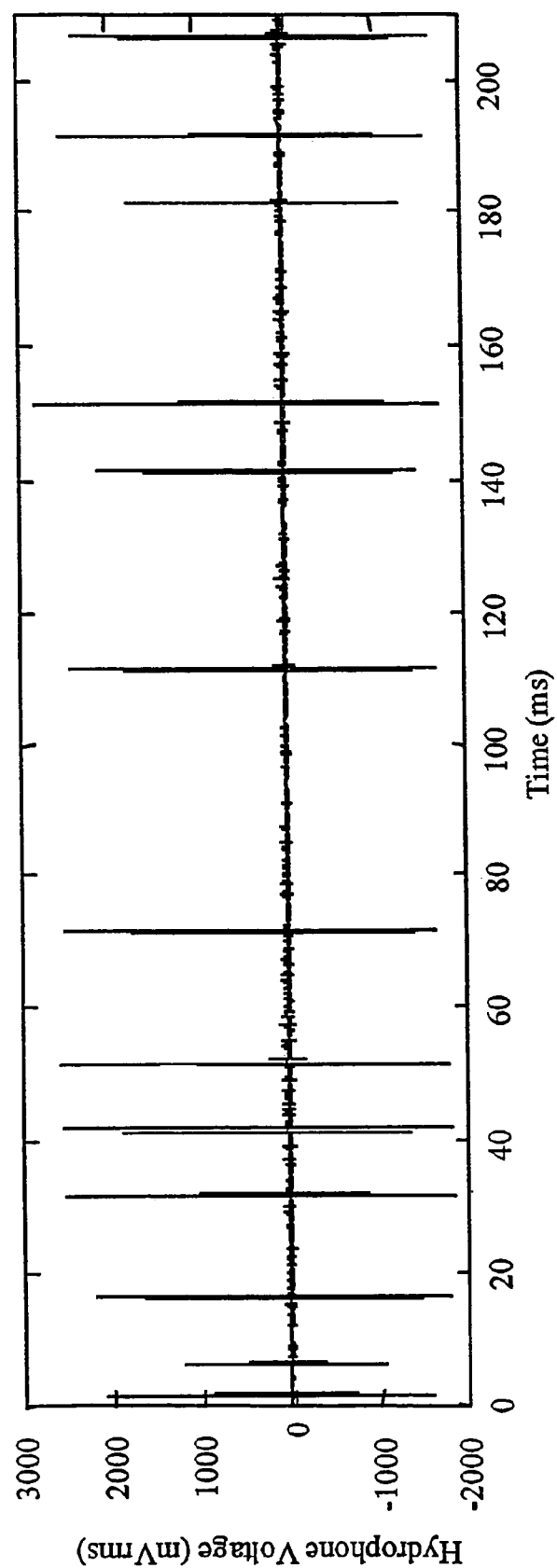
FIG. 5 depicts a plot of an underwater acoustic signal generated by an infrared laser beam having a pulse repetition rate of 200 Hz with the figure showing a detailed time structure of the optoacoustic transient.

The underwater acoustic signal generated with a laser repetition rate of 200 Hz is shown in FIGS. 5-9. The time series data is shown in FIG. 5 where thirteen distinct non-linear optoacoustic pulses are observed, with a maximum SPL of 185.37 dB re µPa. The 200 Hz laser repetition rate should ideally yield a non-linear optoacoustic transmission every 5 milliseconds. This condition occurs most consistently between 0 milliseconds and 50 milliseconds. It is reasonable to conclude that the buildup of a vapor cloud precludes subsequent acoustic signal generation at various times during the transmission period of the laser 20.

Figure 6:
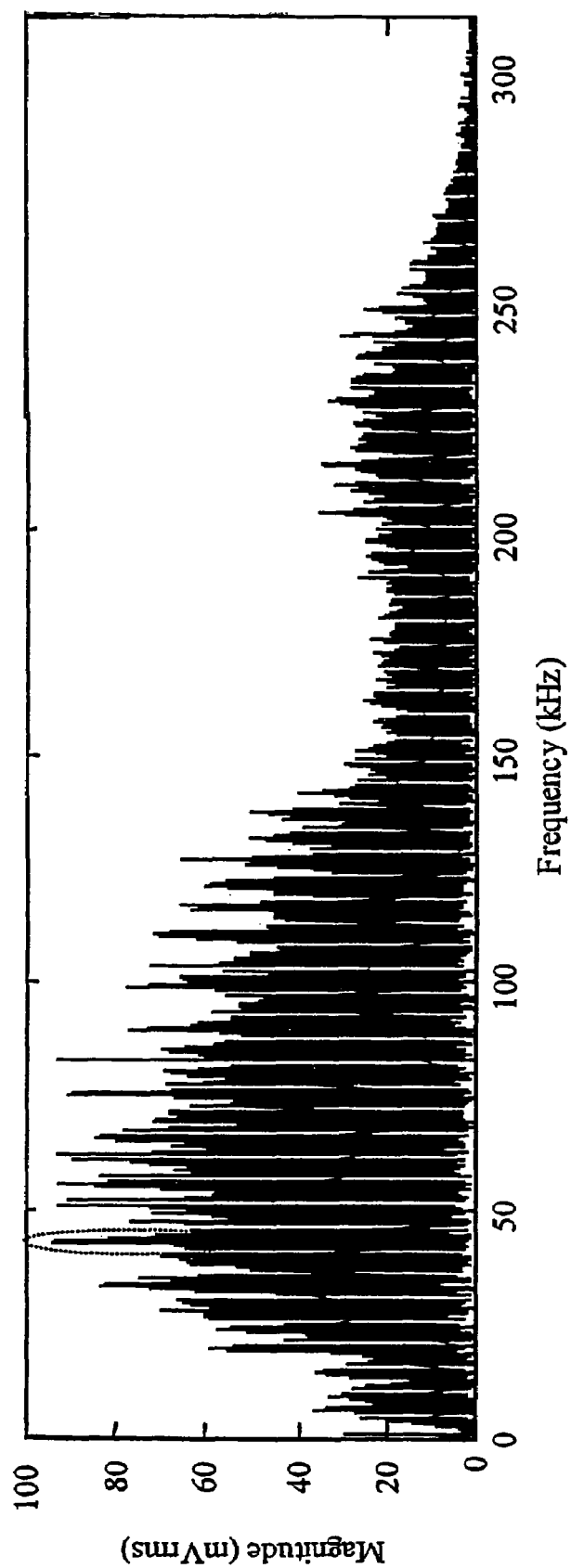
FIG. 6 depicts a plot of an underwater acoustic signal generated by an infrared laser beam having a pulse repetition rate of 200 Hz with the figure showing a detailed Fourier transform.

The Fourier spectral response is shown in FIG. 6. The desired components of the spectrum generated by laser pulse repetition are obscured due to modulation by the single laser pulse spectrum shown in FIG. 4.

Figure 7:
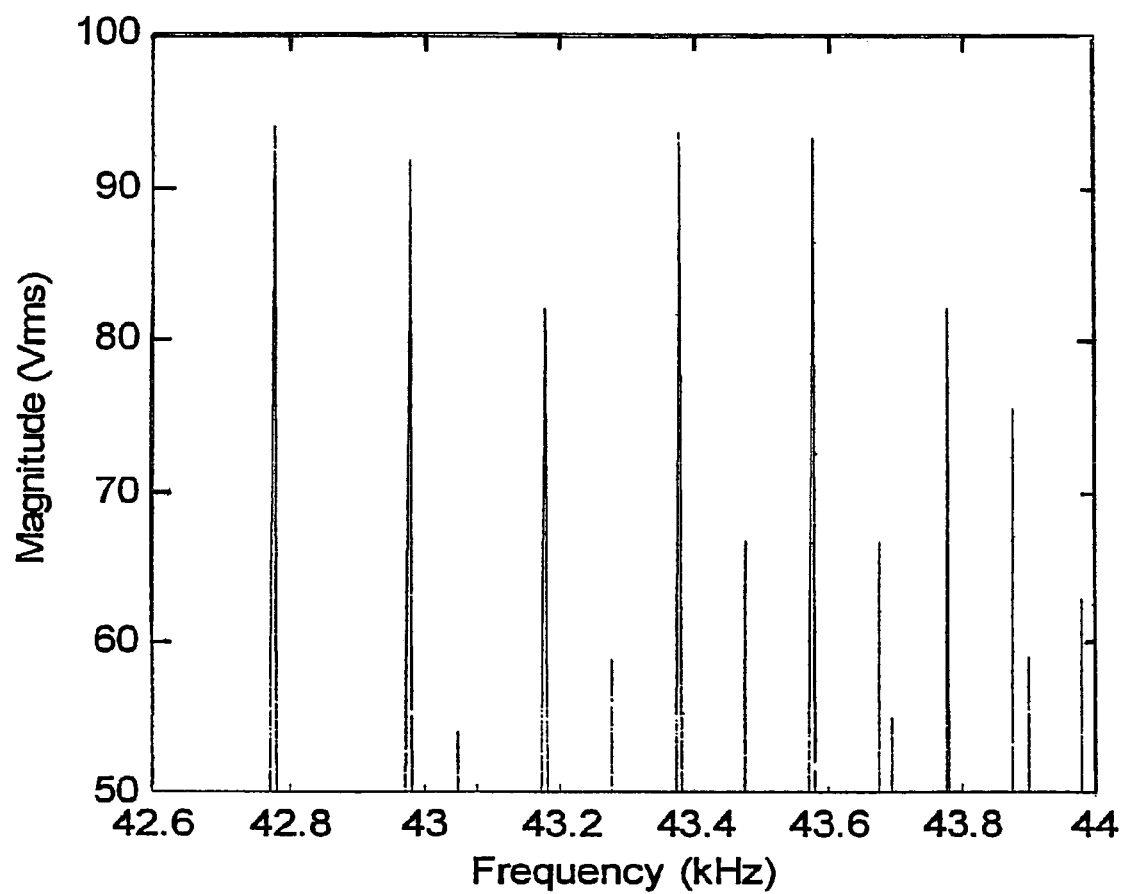
FIG. 7 depicts an enlarged view of FIG. 6 showing the spectrum between 42.6 kHz and 44 kHz.

An enlarged view of the spectrum between 42.6 kHz and 44 kHz is shown in FIG. 7. A 200 Hz separation is observed between oscillations in the spectrum correlating to the frequency of the laser pulse repetition along with additional 100 Hz separations due to 10 milliseconds separation between several non-linear optoacoustic transients.

Figure 8:
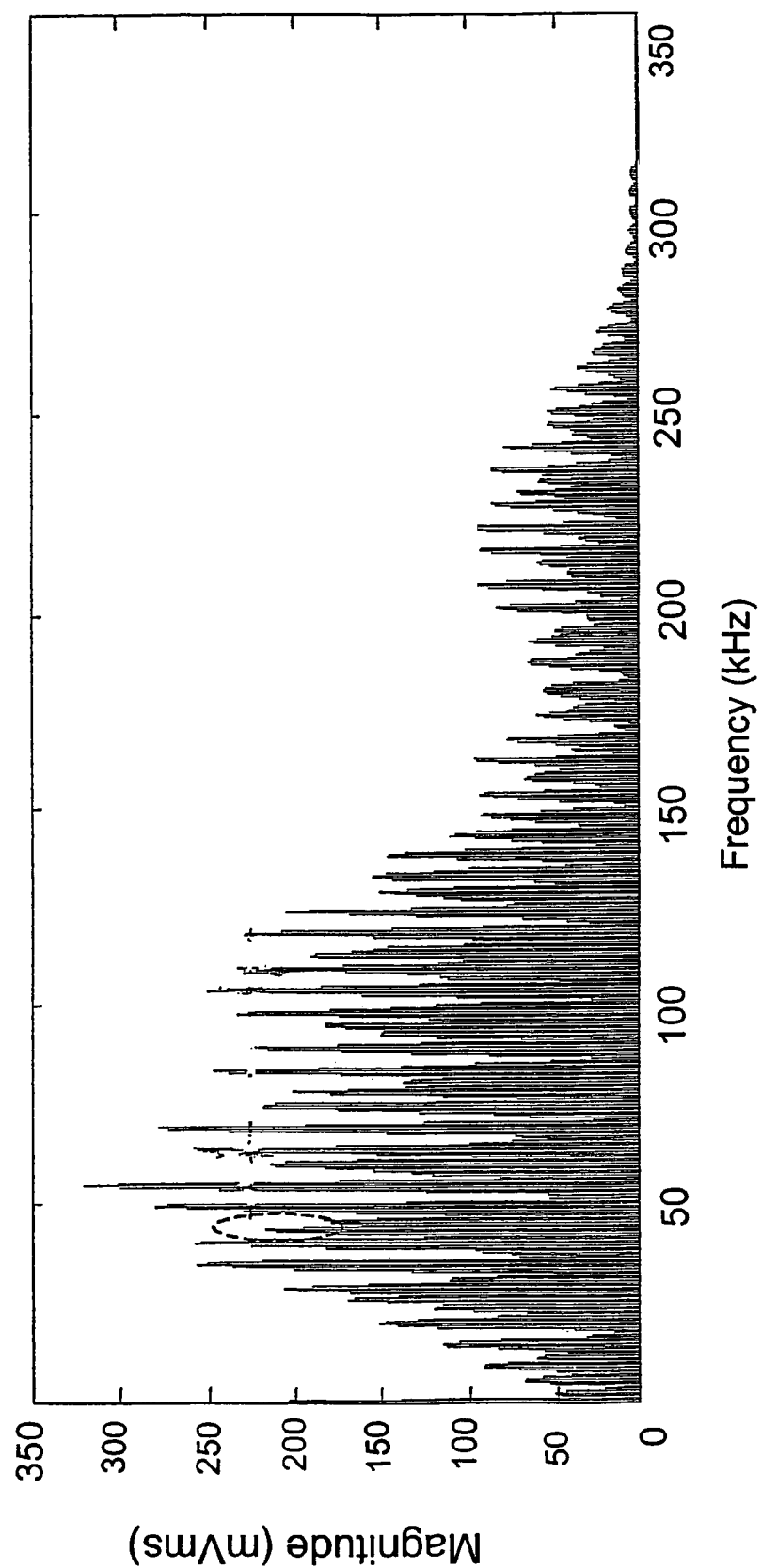
FIG. 8 depicts a plot of an underwater acoustic signal generated by an infrared laser beam having a pulse repetition rate of 200 Hz with the figure showing a simulated Fourier transform.

The simulated Fourier Transform generated by employing Equation (2) using a single experimental, laser generated, acoustic pulse spectrum multiplied by a scaled Dirichlet function using 42 pulses contained within 210 milliseconds at a repetition rate of 200 Hz is shown in FIG. 8. The spectrum shape and content is similar to that shown in FIG. 7.

Figure 9:
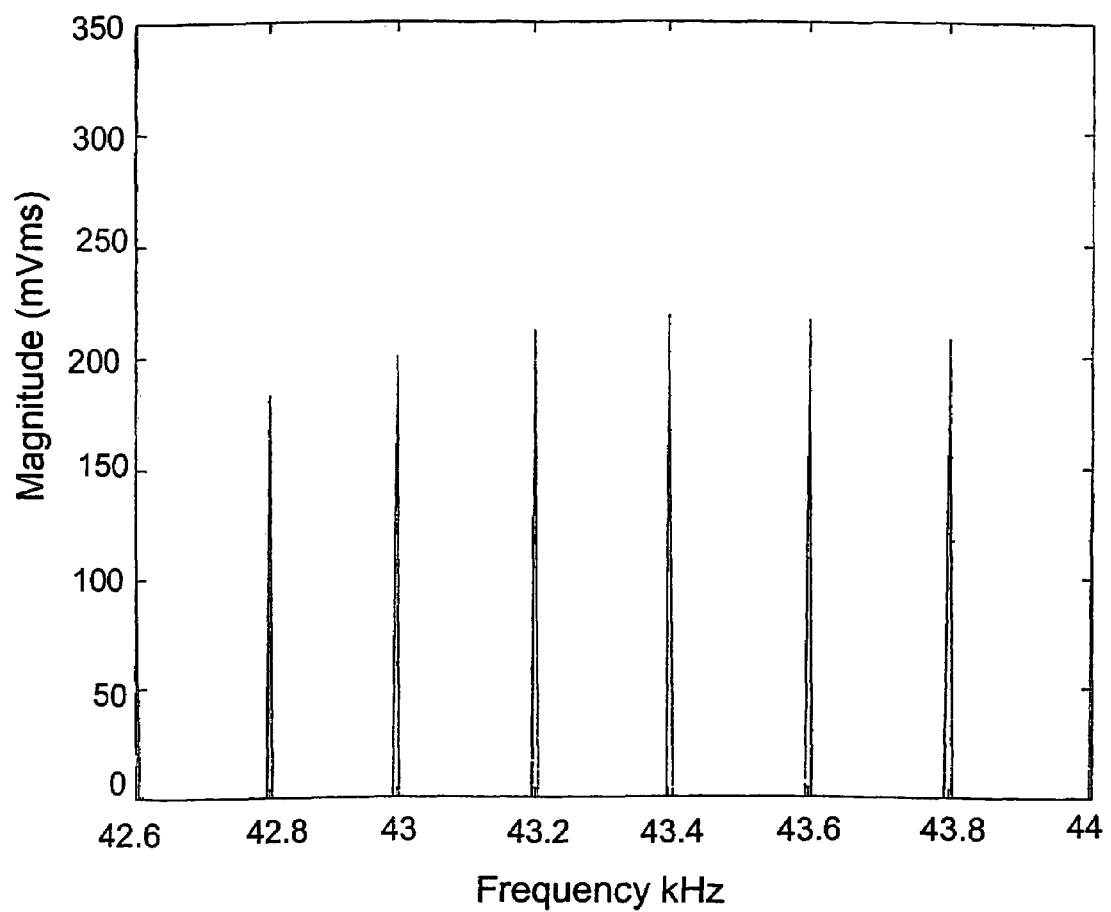
FIG. 9 depicts an enlarged view of FIG. 8 without showing spaced tones between 42.6 Hz and 44 Hz.

An enlarged view of FIG. 9 shows only the 200 Hz tone separation as in the enlarged view of FIG. 8 without any 100 Hz spaced tones. The amplitude of the tones in FIG. 9 is larger compared to FIG. 8 due to the increased number of pulses used in the simulation.

Figure 10:
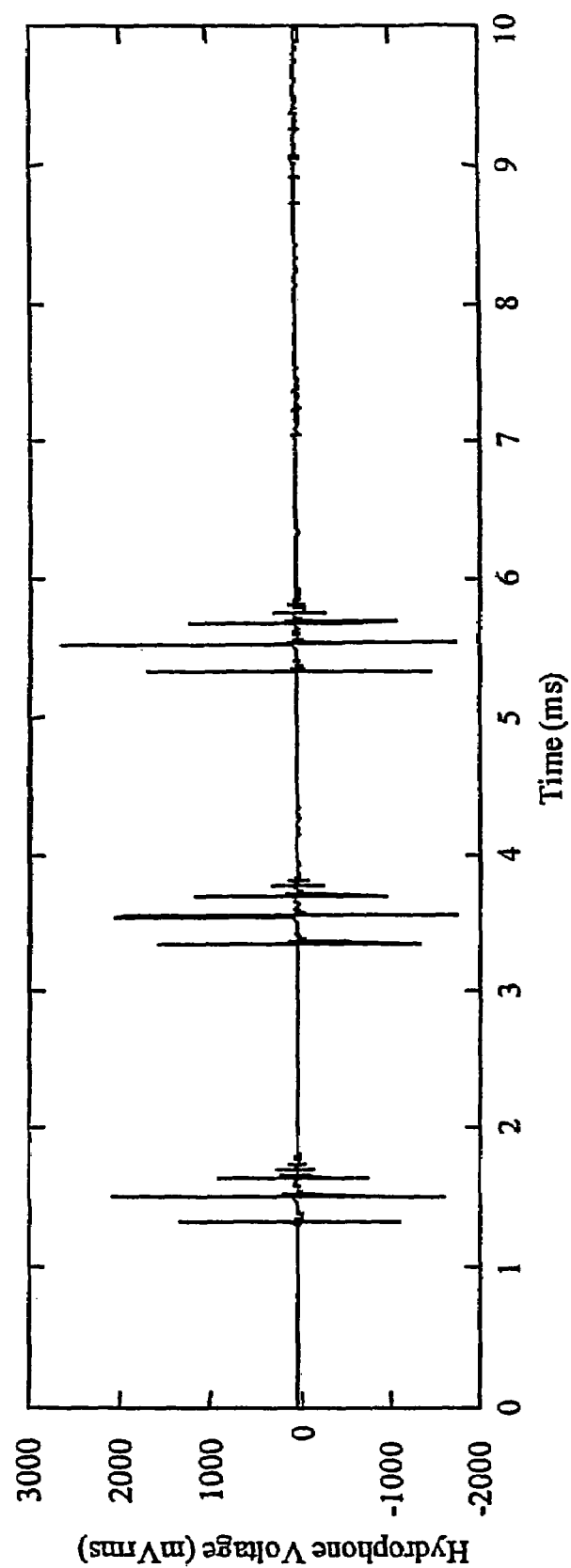
FIG. 10 depicts a plot of an underwater acoustic signal generated by an infrared laser beam having a pulse repetition of 500 Hz with the figure showing a detailed time structure of the optoacoustic transient.

The underwater acoustic signal generated with a laser repetition rate of 500 Hz is shown in FIG. 10. The time series data shown in FIG. 10 has three distinct non-linear optoacoustic pulses with a maximum SPL of 184.91 dB re µPa @1 m. The 2 millisecond separation between pulses is consistent with a 500 Hz laser repetition rate. Once again, it is concluded that the buildup of a vapor cloud precludes subsequent acoustic signal generation following the third set of transients.

Figure 11:
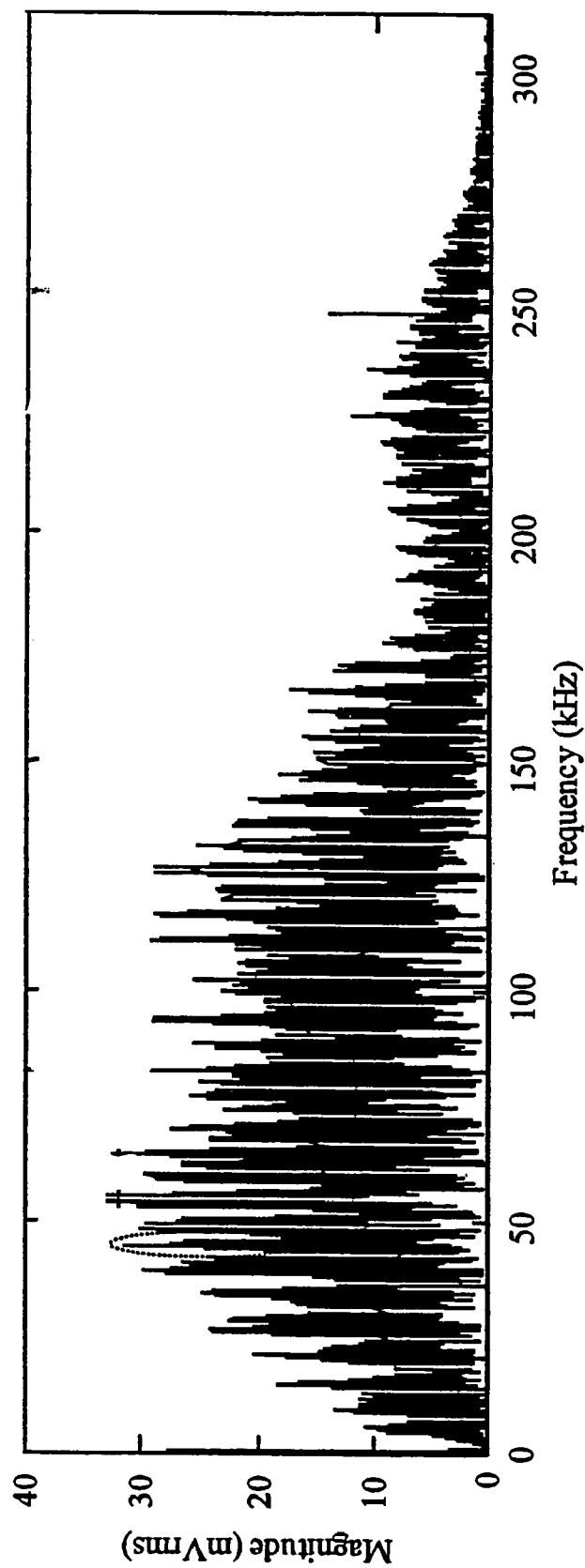
FIG. 11 depicts a plot of an underwater acoustic signal generated by an infrared laser beam having a pulse repetition of 500 Hz with a figure showing a detailed Fourier transform.
Figure 12:
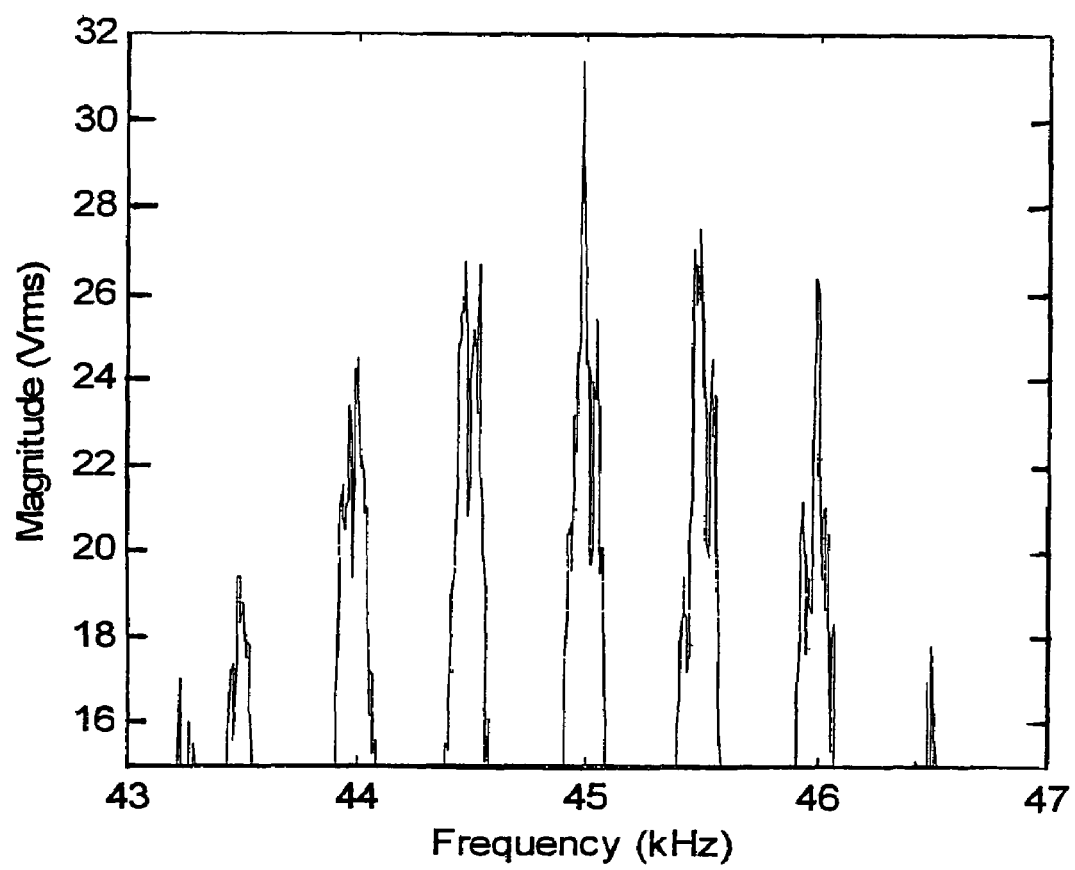
FIG. 12 depicts an enlarged view of FIG. 11 with the spectrum between 43 and 47 kHz.

The spectral response is shown in FIG. 11. The desired components of the spectrum generated by laser pulse repetition are obscured due to modulation by the single laser pulse spectrum shown in FIG. 4. The 80 kHz tone is present for the entire data segment before, during, and after pulsing and is therefore not associated with the laser-generated signal. An enlarged view of the spectrum between 43 kHz and 47 kHz is shown by extension line in FIG. 12. A 500 Hz separation is observed between oscillations in the spectrum, correlated to the frequency of the laser pulse repetition.

Figure 13:
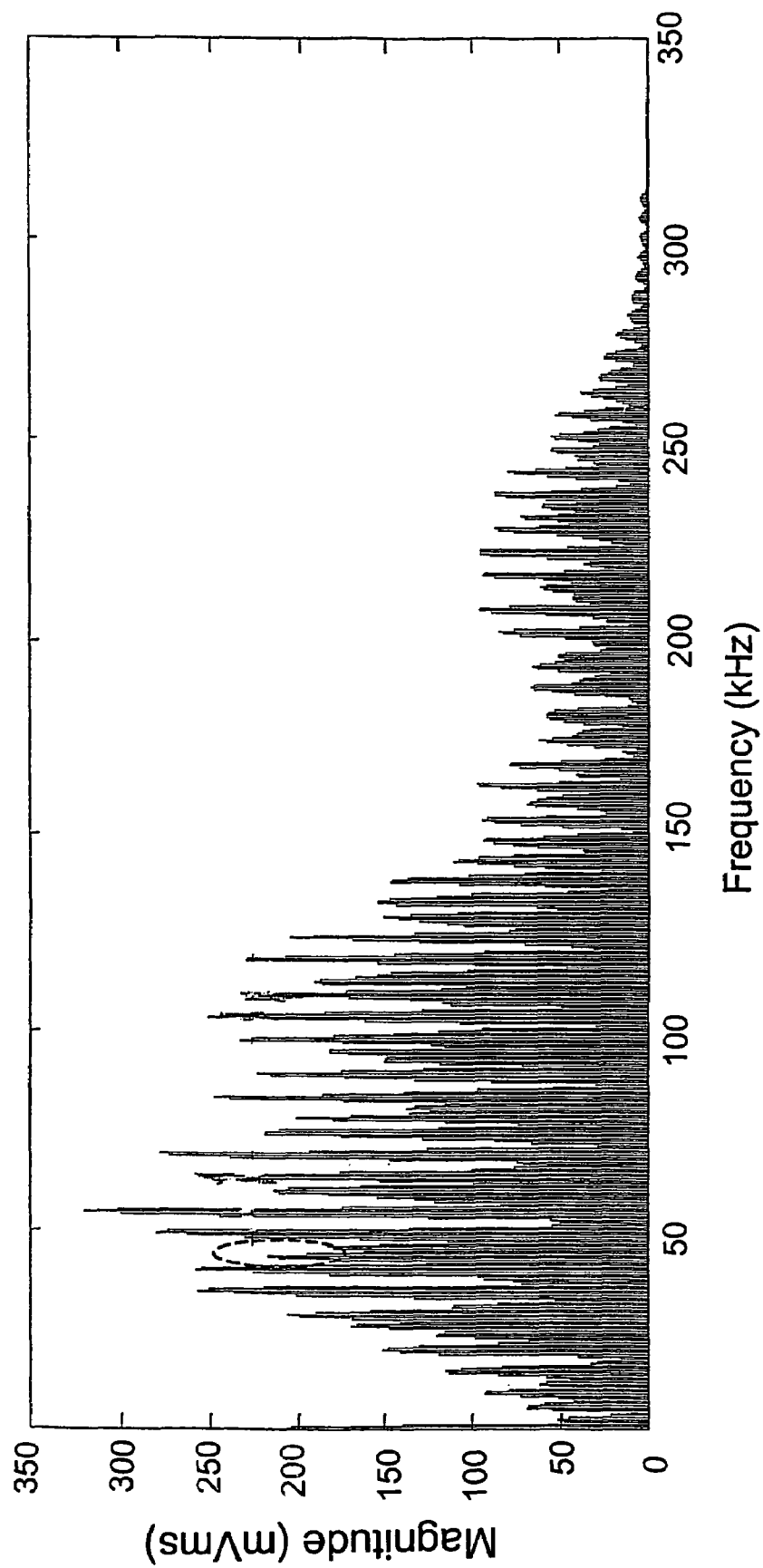
FIG. 13 depicts a plot of an underwater acoustic signal generated by an infrared laser beam having a pulse repetition of 500 Hz with the figure showing a simulated Fourier transform.

The simulated Fourier transform using a single experimental acoustic pulse spectrum multiplied by a scaled Dirichlet function using 5 pulses contained within 10 milliseconds at a repetition rate of 500 Hz is shown in FIG. 13. The spectrum shape and content is similar to that shown in FIG. 11, as is expected.

Figure 14:
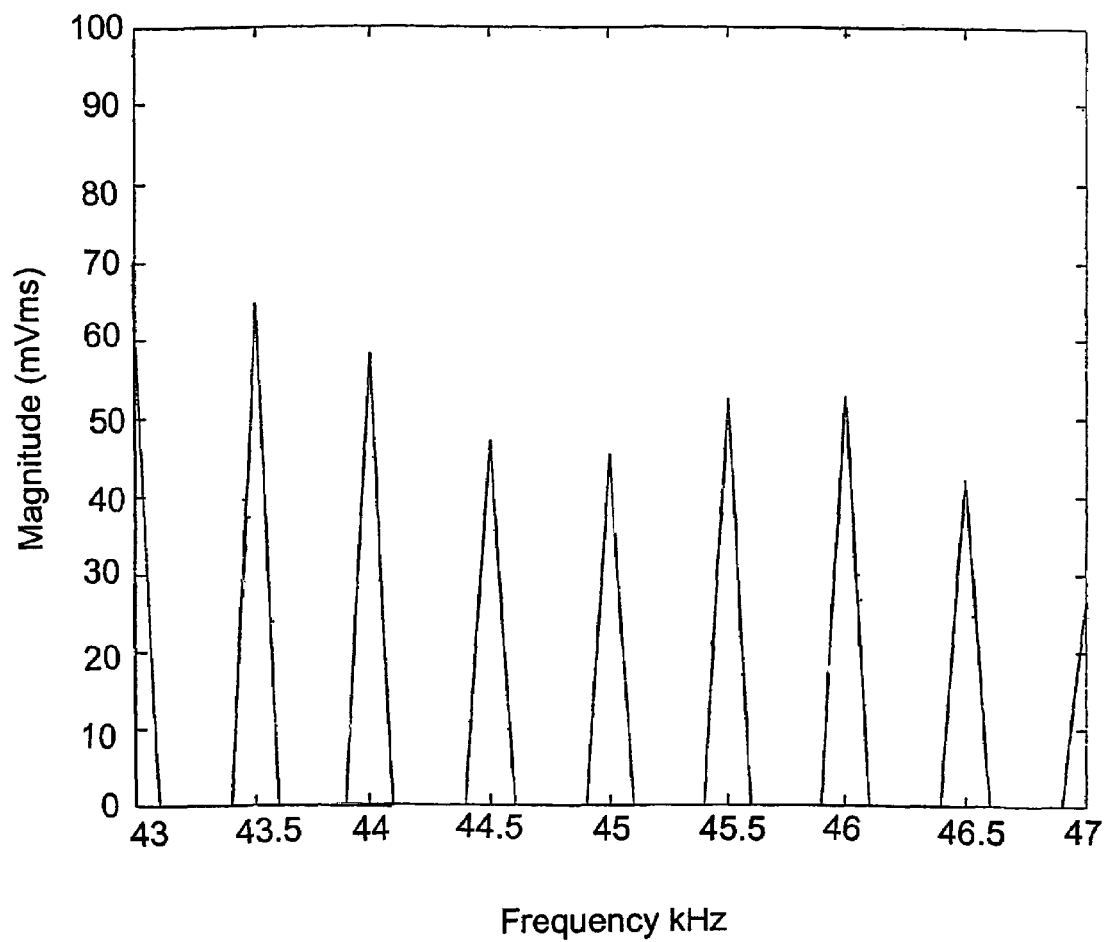
FIG. 14 depicts an enlarged view of FIG. 13 showing a 500-Hz tone separation.

An enlarged view of FIG. 14 shows the 500 Hz tone separation. The amplitude distribution compared to FIG. 11 and the sharpness of the tones in FIG. 13 are due to the two additional pulses used in the simulation as compared to the experimental result.

Figure 15:
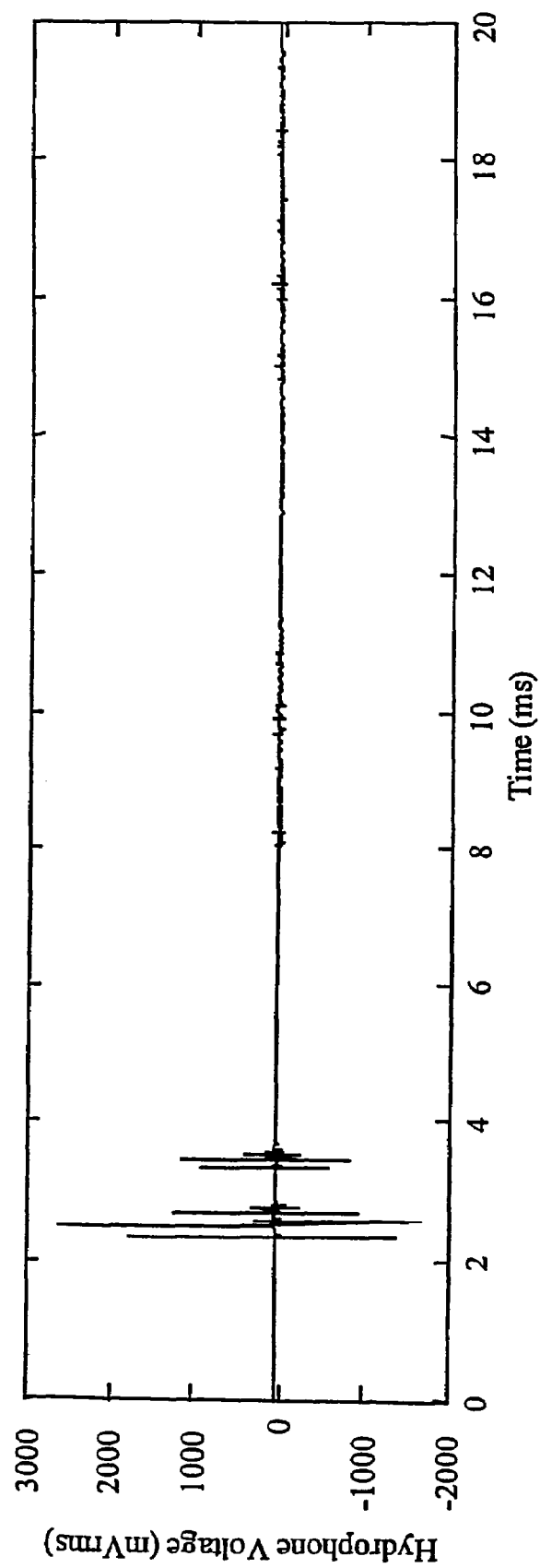
FIG. 15 depicts a plot of an underwater acoustic signal generated by an infrared laser beam having a pulse repetition rate of 1000 Hz with the figure showing a detailed time structure of the optacoustic transient.

The underwater acoustic signal generated with a laser repetition rate of 1000 Hz is shown in FIG. 15. The time series data shown in FIG. 15 has two distinct non-linear optoacoustic pulses with a maximum SPL of 184.63 dB re µPa @1 m and a 1 millisecond separation between the non-linear optoacoustic pulses that is consistent with the 1000 Hz laser repetition rate. The effect of the vapor cloud is more pronounced in this case as compared to the 200 Hz and 500 Hz repetition cases, preventing the generation of any further acoustic transients after the first two sets of transients.

Figure 16:
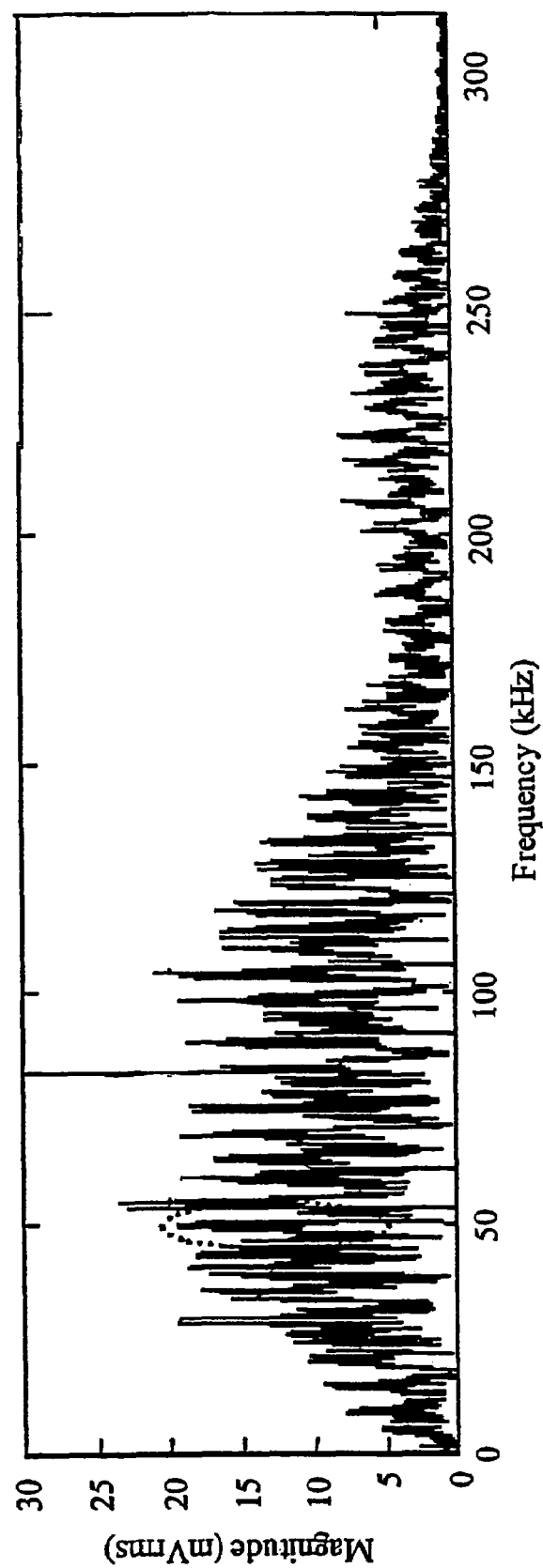
FIG. 16 depicts a plot of an underwater acoustic signal generated by an infrared laser beam having a pulse repetition rate of 1000 Hz and captured by an underwater hydrophone with the figure showing detailed Fourier transform.

The spectral response is shown in FIG. 16. The desired components of the spectrum generated by laser pulse repetition are obscured due to modulation by the single laser pulse spectrum shown in FIG. 4. The 80 kHz tone is present for the entire data segment before, during, and after pulsing of the laser 20 and is therefore not associated with the laser-generated signal.

Figure 17:
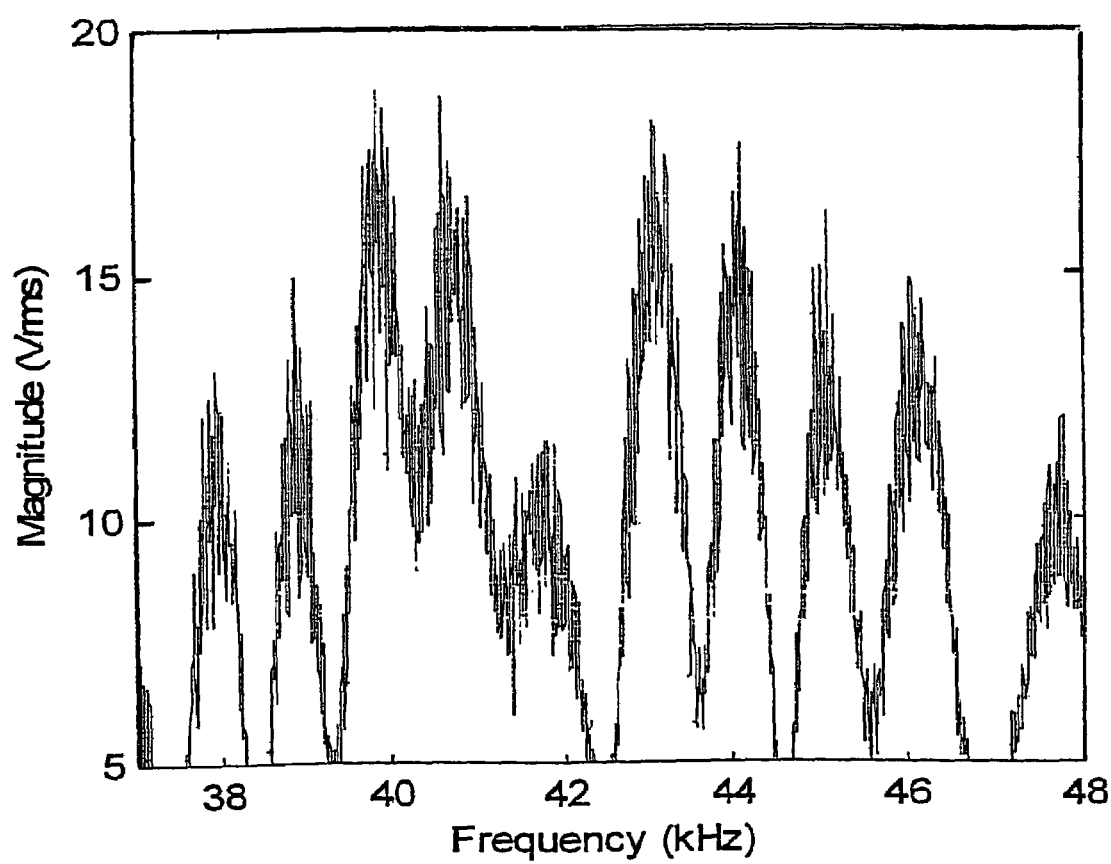
FIG. 17 is an enlarged view of FIG. 16 with a view of the spectrum between 37 and 48 kHz.
Figure 18:
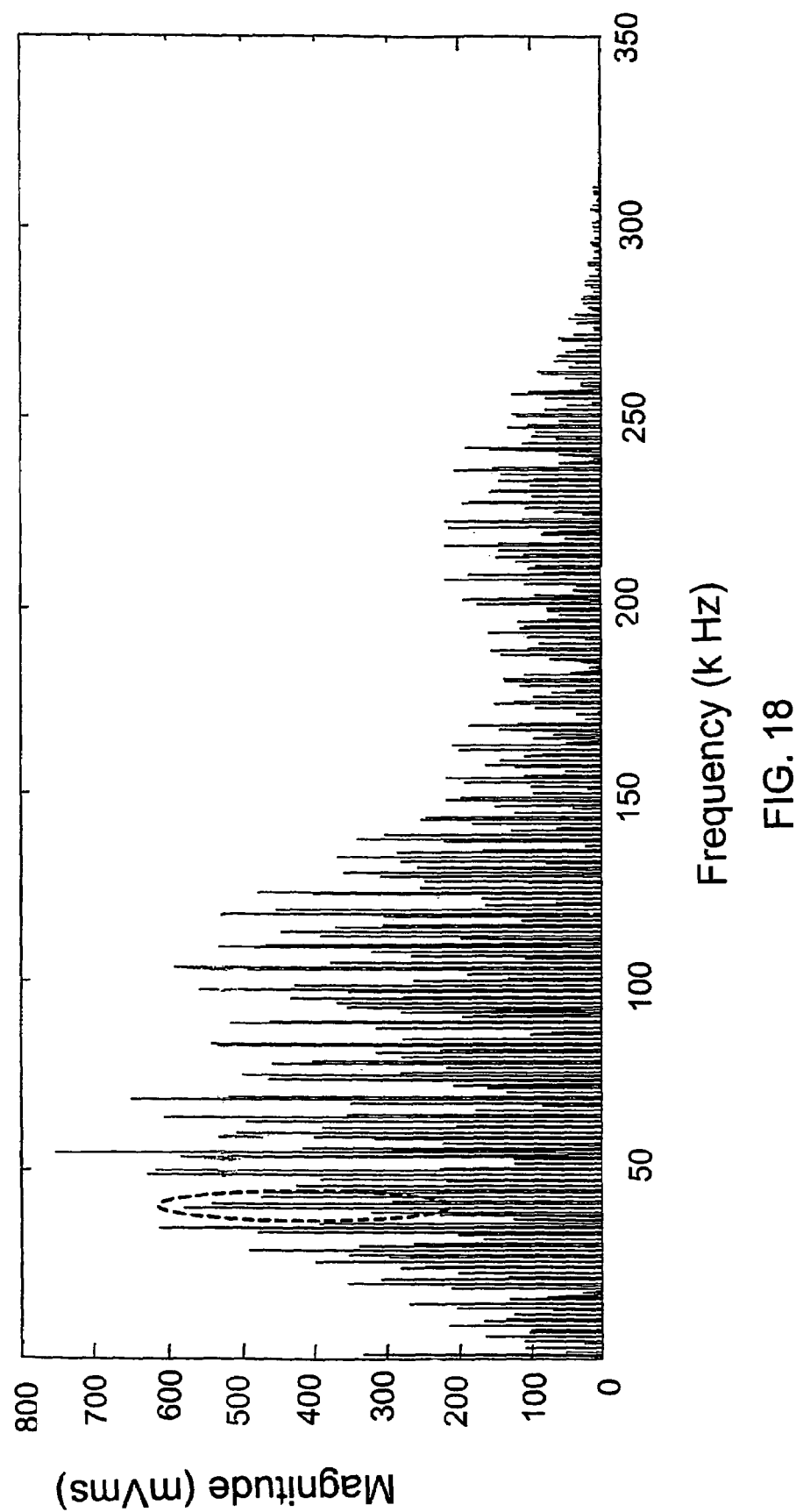
FIG. 18 depicts a plot of an underwater acoustic signal generated by an infrared laser beam having a pulse repetition rate of 1000 Hz with the figure showing a simulated Fourier transform.

An enlarged view of the spectrum between 37 kHz and 48 kHz is shown in FIG. 17. Although a 1000 Hz separation is observed between oscillations in the spectrum that correlate to the frequency of the laser pulse transmissions, the separation is not well defined. This indistinct separation occurs because there were only two non-linear optoacoustic transmission pulses within the Fourier analysis window. The simulated Fourier transform using a single experimental acoustic pulse spectrum multiplied by a scaled Dirichlet function using 20 pulses contained within 20 milliseconds at a repetition rate of 1000 Hz is shown in FIG. 18. The spectrum shape and content is similar to that in FIG. 16, as is expected.

Figure 19:
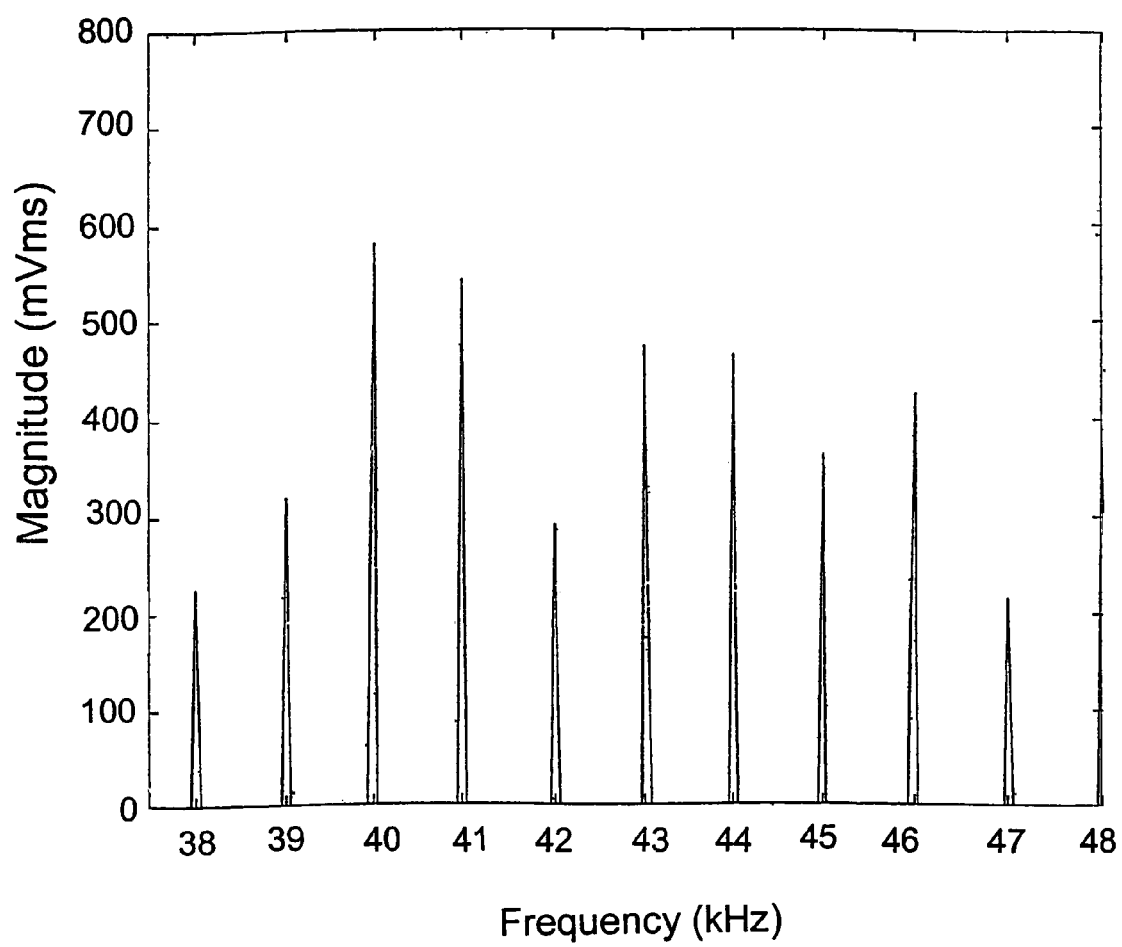
FIG. 19 depicts an enlarged view of FIG. 18 showing distinct tones at 1000 Hz intervals.

In this case, the simulated spectrum close up of FIG. 19 shows distinct tones spaced at 1000 Hz intervals and increased amplitude as compared to the tone amplitude and spectral spread evident in the spectrum close up of FIG. 16 due to the 20 pulses used in the simulation as opposed to only two pulses used in the experimental result.

For each of these test cases, there were occurrences where several laser pulses consecutively generated underwater sound with a number of acoustic transients spaced at the appropriate laser repetition period. There were also laser pulse intervals where no acoustic transients were generated. This inconsistency in consecutive non-linear optoacoustic generation is most likely due to the buildup and formation of a vapor cloud in the vicinity of the laser beam focal area.

The pulse-to-pulse laser energy varies by +/−3% at each laser repetition rate setting. Therefore, this slight laser pulse energy variation is not responsible for the missing acoustic transients. It should be noted that in addition to the vapor cloud there exists the potential for non-linear interaction of subsequent laser pulses when the laser pulse repetition rate is greater than 1 kHz. This is due to the fact that bubbles are still expanding and collapsing in the focal volume within this time scale.

The highest SPL produced by the optoacoustic transmissions is 185.61 dB re µPa at 1 m. The pulsing of the laser 20 provides control and placement of the transmitted acoustic spectral energy. However, the frequency components associated with bubble oscillation, in particular the delay between the initial shock wave and the adjacent bubble-generated acoustic transients, produces a modulation of the frequency content that complicates the acoustic spectrum. Acoustic transients are not produced each time the laser is pulsed. This condition is most probably caused by the buildup and formation of a vapor cloud in the focal volume. This issue can be mitigated by using high-speed laser scanning and dithering techniques known to those skilled in the art.

As described above, the pulse repetition rate of the laser 20 can be used to transmit selected acoustic frequencies by controlling the frequency placement and spacing of components in the spectrum via the creation of acoustic transients associated with controlled periodic laser pulsation. However, the overall spectrum remains relatively broadband and constant throughout due to the transient nature of the non-linear optoacoustic conversion process. The experimental spectral results described above are verified against simulated responses based on a single experimental acoustic pulse spectrum that was weighted by a scaled Dirichlet function at the corresponding laser repetition rate.

The data demonstrates the enhanced feasibility of remote, aerial generation of underwater acoustic signals with higher conversion efficiency by employing non-linear optoacoustic interaction at the air/water interface 120. Using these techniques and with refinements, the airborne high-energy, pulsed laser 20 can more remotely and more covertly generate spectrally controllable, deterministic, high amplitude underwater acoustic signals that can be used for acoustic communication from in-air platforms to submerged platforms as well as for sonar and other applications.

There are a number of new features and advantages to the system 10 of the present invention. The first advantage is that the system 10 is a non-contact, covert method to obtain acoustic downlink communications to a submerged platform at speed and depth. This communication scheme allows the in-air platform 12 to maintain its stealth posture at the desired operating depth while traveling at normal speed without requiring lengthy optical alignment procedures required for all optical communications where water turbidity plays a deciding role in performance.

The downlink is extremely flexible. The frequency range of the downlink spans all useable acoustic frequencies from low frequency to frequencies above 100 kHz. Therefore, a number of platforms can be integrated simultaneously by using separate frequency bands such as for the applications of cooperative behavior and swarming of UUVs. Also, the data rate for the link can vary as needed by using this bandwidth in an efficient manner such as using Orthogonal Frequency Division Multiplexing (OFDM) and spread spectrum techniques as well as other incoherent M-ary FSK techniques.

In-air range and therefore overall communication range is gained through using the laser beam 30 which can be directed vertically downward toward the water surface 50 or at an oblique angle to the water surface. Also, the downlink acoustic beam pattern is controllable based upon parameters of the laser 20, and its scanning and/or the use of multiple lasers thus providing another level of flexibility and covertness. The scanning and control of the laser beams 30 on the air/water interface 120 provides another ability to link with a number of platforms operating in the area. The downlink system can use technology and systems that have been developed for the high energy laser weapon programs and therefore share a dual use capability with current laser systems onboard in-air platforms.

The remote, laser-based sound generation and sensing capability can be used for a number of related applications such as threat detection, marine mammal detection, sonar, etc. This capability provides a full duplex, bi-directional, communications capability for a wide variety of applications and missions involving submarines, SDVs, and UUVs as well as future platforms.

Thus, the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A system for communications from an in-air platform to a submerged platform in a water medium, said system comprising:

a modulator positioned on the in-air platform above the water medium with said modulator capable of creating a communications signal for underwater propagation as part of a communication scheme;

a laser positioned on the in-air platform and electronically connected to said modulator with said laser provided to send a pulsed laser beam in a non-linear regime with the laser beam containing the communications signal;

a laser beam expander positioned on the on-air platform and within the path of the laser beam;

a mirror positioned on the on-air platform between said laser beam expander and the water medium such that said mirror reflects the laser beam from said laser at an angle for the laser beam to impact the water medium substantially perpendicular to a surface of the water medium;

a focusing lens positioned on the in-air platform between said mirror and the water medium and within the path of the pulsed laser beam such that said focusing lens is capable of producing a laser spot on the water medium with the pulsed laser beam;

a telemetry receiver positioned in the water medium, said telemetry receiver including a sensor to detect oscillations within the water medium and a demodulator-decoder electronically connected to said sensor;

wherein the laser beam is sent to the water medium by said laser at an air/water interface with the laser beam vaporizing and optically breaking-down a portion of the water medium and generating bubble oscillations measurable by said telemetry receiver proximate to the vaporized portion of the water medium such that the communications signal is recognized.

2. The system in accordance with claim 1 wherein said laser varies a wavelength and pulse duration of the laser beam to vary the acoustic transients.

3. The system in accordance with claim 2 wherein said laser varies focusing of the laser beam to vary the acoustic transients.

4. The system in accordance with claim 3 wherein said modulator produces a communications scheme for the communications signal selected from the group consisting of multi-frequency shift keying and frequency-hopped spectrum modulation.

* * * * *